3,161,496
METHOD OF REDUCING POPULATION OF WEEDS AND COMBATTING INSECTS
John J. D'Amico, Nitro, W. Va., assignor to Monsanto Company, a corporation of Delaware
No Drawing. Filed May 26, 1958, Ser. No. 737,546
12 Claims. (Cl. 71—2.6)

The present invention relates to lower acyclic hydrocarbon esters of dithiocarbanilic acids and to methods for their use to destroy animal and vegetable pests.

The desired biological activity requires the presence of at least one allyl group. The new compounds may be represented by the structure

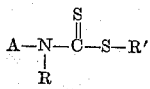

where A represents an aryl radical of the benzene series and R and R' represent lower acyclic hydrocarbon radicals containing not more than one unsaturated bond and carbon to carbon valences no greater than two, at least one of which is allyl. The aryl group may be halogen substituted.

Examples of the new compounds are illustrated by the following:

allyl N-methyldithiocarbanilate,
allyl N-ethyldithiocarbanilate,
allyl N-allyldithiocarbanilate,
methyl N-allyl-3-chlorodithiocarbanilate,
ethyl N-allyl-3-chlorodithiocarbanilate,
methyl N-allyl-3-bromodithiocarbanilate,
ethyl N-allyl-3-bromodithiocarbanilate,
allyl N-ethyl-3-bromodithiocarbanilate,
allyl N-allyl-3-bromodithiocarbanilate,
allyl N-methyl-3-chlorodithiocarbanilate,
allyl N-ethyl-3-chlorodithiocarbanilate,
allyl N-allyl-3-chlorodithiocarbanilate,
allyl N-ethyl-2-chloro-4-methyldithiocarbanilate,
methyl N-allyl-3,4-dichlorodithiocarbanilate,
methyl N-allyl-2,4-dichlorodithiocarbanilate,
allyl N-methyl-2,4-dichlorodithiocarbanilate,
allyl N-ethyl-2,4-dichlorodithiocarbanilate,
allyl N-allyl-2,4-dichlorodithiocarbanilate
allyl N-allyl-3,4-dichlorodithiocarbanilate,
allyl N-allyl-2,6-dichlorodithiocarbanilate,
methyl N-allyl-2,6-dichlorodithiocarbanilate,
allyl N-methyl-2,6-dibromodithiocarbanilate,
allyl N-ethyl-2,6-dibromodithiocarbanilate,
allyl N-methyl-2,4,5-trichlorodithiocarbanilate,
allyl N-ethyl-2,4,5-trichlorodithiocarbanilate,
allyl N-allyl-2,4,5-trichlorodithiocarbanilate,
methyl N-allyl-2,4,5-tribromodithiocarbanilate,
ethyl N-allyl-2,4,5-tribromodithiocarbanilate and
allyl N-allyl-2,4,5-tribromodithiocarbanilate.

The compounds may be conveniently prepared by esterifying the corresponding dithiocarbanilic acid. The following specific examples are to be understood as illustrative of the invention but in nowise limitative of the scope thereof.

Example 1

A solution of 61 grams (0.3 mole) of N-allyl-3,4-dichloraniline in 60 ml. of ethyl alcohol and 30 grams of concentrated ammonium hydroxide was prepared. The solution was stirred while 33 grams (0.396 mole) of carbon bisulfide was added in one portion. Stirring was continued at 25–30° C. for one hour and then 23 grams (0.3 mole) of allyl chloride added in one portion and the reaction mixture stirred at 25–30° C. for 24 hours. Then 400 ml. of water was added, the mixture cooled to 25° C. and extracted with 400 ml. of ethyl ether. The ether solution was washed with dilute hydrochloric acid until the aqueous layer did not yield any amine upon neutralization with 25% sodium hydroxide, then with water until neutral to litmus and dried over sodium sulfate at 80–90° C. at 1–2 mm. to yield 87 grams (91.5%) of allyl N-allyl-3,4-dichlorodithiocarbanilate as an amber oil. It contained 4.9% nitrogen as compared to 4.4% calculated for $C_{13}H_{13}Cl_2NS_2$.

Example 2

In this example 42.6 grams (0.3 mole) of methyl iodide was substituted for the allyl chloride in Example 1. After the addition of the carbon bisulfide the reaction mixture was heated at 50–60° C. for 24 hours. Then 400 ml. of water was added and after cooling to 25° C. the reaction mixture was extracted with 400 ml. of ethyl ether. The ether solution was washed wtih water until neutral to litmus, dried over sodium sulfate and thet ether removed in vacuo at a maximum temperature of 80–90° C. at 1–2 mm. The methyl N-allyl-3,4-dichlorodithiocarbanilate was obtained in 85.5% yield. It was an amber oil insoluble in water but soluble in common organic solvents.

Example 3

To a stirred solution at 25–30° C. containing 60.6 grams (0.5 mole) of N-ethylaniline, 50 grams of concentrated ammonium hydroxide and 100 ml. of ethyl alcohol was added in one portion 50 grams (0.66 mole) of carbon bisulfide. The mixture was stirred at 25–30° C. for one hour and to it was added 38.2 grams (0.5 mole) of allyl chloride. An exothermic reaction set in causing the temperature to rise from 20 to 46° C. The reaction mixture was stirred at 25–30° C. for 24 hours and the product isolated as in Example 1. The yield of allyl N-ethyldithiocarbanilate, an amber oil, was 80.1%. Analysis gave 5.8% nitrogen as compared to 5.9% calculated for $C_{12}H_{15}NS_2$.

Example 4

A solution was prepared by admixing 107.2 grams (1.0 mole) of N-methylaniline, 100 grams of concentrated ammonium hydroxide and 200 ml. of ethyl alcohol. To the solution so prepared there was added in one portion 100 grams (1.32 moles) of carbon bisulfide. By external cooling the temperature was maintained at 25–30° C. over a one hour period. To the stirred resulting precipitate was added in one portion 76.5 grams (1.0 mole) of allyl chloride. An exothermic reaction set in causing a temperature rise from 25 to 56° C. in 15 minutes. The reaction mixture was stirred for 24 hours, poured into 500 cc. of ice and stirred for 15 minutes. The allyl N-methyldithiocarbanilate isolated as in Example 1 was obtained in 84% yield. It was a yellow solid melting at 38–40° C. Analysis gave 6.2% nitrogen and 28.5% sulfur as compared to 6.3% nitrogen and 28.7% sulfur calculated for $C_{11}H_{13}NS_2$.

The compounds of this invention are toxic to insect pests. While they have little contact activity they are also valuable as pre-emergent grass-specific herbicides. This combination of properties is valuable because a single application to the soil reduces the population of weedy grasses and soil borne insects. The toxicants may be applied in solution, emulsion, water dispersion or as a dust formulation wherein the active ingredient is mixed with a finely divided solid carrier, as for example talc, clay, pyrophyllite, silica and fuller's earth. As dispersing and wetting agents there may be employed soft or hard sodium or potassium soaps, alkylated aromatic sodium sulfonates such as sodium dodecylbenzenesulfonate, or an amine salt of dodecylbenzenesulfonic acid, alkali metal salts of sulfated fatty alcohols, ethylene oxide condensation products of alkyl phenols or tall oil and other dispersing and wetting agents. The required concentration of active ingredient will vary depending upon use. Sprays for application as insecticidal compositions to agricultural crops may suitably be applied at concentrations of 0.001 to 5.0%. For pre-emergence application as herbicides, amounts within the range of 1 to 60 pounds per acre are recommended.

As illustrative of the insecticidal activity, the products of Examples 1, 2, 3 and 4 were tested against larvae of the yellow fever mosquito and 100% kill noted in all cases at both 0.001% and 0.0005% concentration. Also, the compound of Example 1 gave 90% kill at a concentration of 0.0001% while at a concentration as low as 0.00006%, the product of Example 2 caused 25% kill of the larvae.

The following illustrates the effectiveness of the compounds as herbicides. The ester was emulsified in water and the emulsion applied as a spray. In this manner the active ingredient was applied to seeded plots before the plants emerged. At the rate of 25 pounds per acre the products of Examples 1, 2, 3 and 4 severely injured pigweed, foxtail and crab grass. The use as foliage toxicants was demonstrated by applying the active ingredient as an aqueous spray to the foliage. Methyl N-allyl-3,4-dichlorodithiocarbanilate tested in this manner killed radish plants and was severely toxic to corn, beets and buckwheat at a concentration of 0.5%.

It is intended to cover all changes and modifications of the examples of the invention herein chosen for purposes of disclosure which do not constitute departures from the spirit and scope of the invention.

What is claimed is:

1. The method of reducing the population of weedy grasses and soil borne insects which comprises applying to soil a concentration toxic to weedy grasses and soil borne insects of a compound of the structure

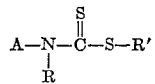

where A is selected from the group consisting of phenyl and halogenated phenyl, R and R' are selected from the group consisting of lower alkenyl and lower alkyl at least one of R and R' being allyl.

2. The method of reducing the population of weedy grasses and soil borne insects which comprises applying to soil a concentration toxic to weedy grasses and soil borne insects of a compound of the structure

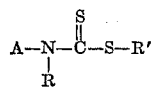

where A is chlorinated phenyl, R is lower alkyl and R' is allyl.

3. The method of reducing the population of weedy grasses and soil borne insects which comprises applying to soil a concentration toxic to weedy grasses and soil borne insects of allyl N-ethyldithiocarbanilate.

4. The method of reducing the population of weedy grasses and soil borne insects which comprises applying to soil a concentration toxic to weedy grasses and soil borne insects of allyl N-methyldithiocarbanilate.

5. The method of reducing the population of weedy grasses and soil borne insects which comprises applying to soil a concentration toxic to weedy grasses and soil borne insects of allyl N-allyl-3,4-dichlorodithiocarbanilate.

6. The method of reducing the population of weedy grasses and soil borne insects which comprises applying to soil a concentration toxic to weedy grasses and soil borne insects of methyl N-allyl-3,4-dichlorodithiocarbanilate.

7. A method of combatting insects which comprises contacting the insects with a composition containing as an essential active component thereof in a concentration toxic to insects, a compound of the structure

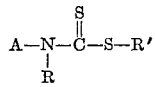

where A is selected from the group consisting of phenyl and halogenated phenyl, R and R' are selected from the group consisting of lower alkenyl and lower alkyl at least one of R and R' being allyl.

8. A method of combatting insects which comprises contacting the insects with a composition containing as an essential active component thereof in a concentration toxic to insects, a compound of the structure

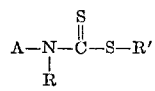

where A is chlorinated phenyl, R is lower alkyl and R' is allyl.

9. A method of combatting insects which comprises contacting the insects with a composition containing as an essential active component thereof in a concentration toxic to insects allyl N-ethyldithiocarbanilate.

10. A method of combatting insects which comprises contacting the insects with a composition containing as an essential active component thereof in a concentration toxic to insects allyl N-methyldithiocarbanilate.

11. A method of combatting insects which comprises contacting the insects with a composition containing as an essential active component thereof in a concentration toxic to insects allyl N-allyl-3,4-dichlorodithiocarbanilate.

12. A method of combatting insects which comprises contacting the insects with a composition containing as an essential active component thereof in a concentration toxic to insects methyl N-allyl-3,4-dichlorodithiocarbanilate.

References Cited in the file of this patent

UNITED STATES PATENTS

| | | |
|---|---|---|
| Re. 22,750 | Tisdale, et al. | Apr. 30, 1946 |
| 2,060,733 | Hunt et al. | Nov. 10, 1936 |
| 2,744,898 | Harman et al. | May 8, 1956 |
| 2,863,899 | Harris | Dec. 9, 1958 |
| 2,895,980 | Harman et al. | July 21, 1959 |
| 2,905,586 | Harman | Sept. 22, 1959 |
| 2,941,897 | Goodhue | June 21, 1960 |
| 2,943,972 | Kerk | July 5, 1960 |
| 2,997,382 | Harman et al. | Aug. 22, 1961 |